US011738718B2

(12) United States Patent
Poton et al.

(10) Patent No.: US 11,738,718 B2
(45) Date of Patent: Aug. 29, 2023

(54) ADAPTER FOR A WIPER BLADE MOUNTING OF A MOTOR VEHICLE

(71) Applicant: Valeo Systemes d'Essuyage, La Verriere (FR)

(72) Inventors: Eric Poton, La Verriere (FR); Stephane Houssat, La Verriere (FR); Vincent Gaucher, La Verriere (FR)

(73) Assignee: Valeo Systemes d'Essuyage, La Verriere (FR)

( * ) Notice: Subject to any disclaimer, the term of this patent is extended or adjusted under 35 U.S.C. 154(b) by 0 days.

(21) Appl. No.: 17/417,322

(22) PCT Filed: Dec. 9, 2019

(86) PCT No.: PCT/EP2019/084280
§ 371 (c)(1),
(2) Date: Jun. 22, 2021

(87) PCT Pub. No.: WO2020/136002
PCT Pub. Date: Jul. 2, 2020

(65) Prior Publication Data
US 2022/0048474 A1    Feb. 17, 2022

(30) Foreign Application Priority Data

Dec. 27, 2018 (FR) ...................... 1874275

(51) Int. Cl.
*B60S 1/40*    (2006.01)
*B60S 1/38*    (2006.01)

(52) U.S. Cl.
CPC .......... *B60S 1/3801* (2013.01); *B60S 1/3851* (2013.01); *B60S 1/3853* (2013.01); *B60S 1/3858* (2013.01);
(Continued)

(58) Field of Classification Search
CPC ........ B60S 1/3848; B60S 1/40; B60S 1/3801; B60S 1/3851; B60S 1/3858; B60S 1/3853;
(Continued)

(56) References Cited

U.S. PATENT DOCUMENTS 7,353,562 B2    4/2008  Huang
7,814,611 B2 *  10/2010 Heinrich ............... B60S 1/3867
                                                    15/250.43
(Continued)

FOREIGN PATENT DOCUMENTS

CN    101437710 A    5/2009
CN    102582582 A    7/2012
(Continued)

OTHER PUBLICATIONS

European Patent Office, International Search Report and Written Opinion of corresponding International Application No. PCT/EP2019/084280, dated Feb. 14, 2020.
(Continued)

*Primary Examiner* — Gary K. Graham
(74) *Attorney, Agent, or Firm* — Valeo Systemes d'Essuyage (57) ABSTRACT

The invention relates to an adapter for a wiper blade mounting, the adapter comprising a cover which can be releasably attached to a main bar of the mounting by a single rotational movement that allows form-closure engagement between the cover and the main bar. According to the invention, the cover comprises an angular indexing system for defining an axis of rotation of the cover, the angular indexing system cooperating with an opening in the main bar. The opening and the angular indexing system have an asymmetrical form in order to allow angular indexing of the cover relative to the main bar and, subsequently, mechanical
(Continued)

coupling of the cover on the main bar. The invention is applicable to motor vehicles.

12 Claims, 6 Drawing Sheets

(52) U.S. Cl.
CPC ............... *B60S 1/3867* (2013.01); *B60S 1/40* (2013.01); *B60S 1/387* (2013.01); *B60S 2001/4093* (2013.01)

(58) Field of Classification Search
CPC .... B60S 1/3867; B60S 1/3849; B60S 1/3865; B60S 1/387; B60S 2001/4093; B60S 2001/3813; B60S 2001/409
USPC ............. 15/250.361, 250.43, 250.44, 250.32
See application file for complete search history.

(56) References Cited

U.S. PATENT DOCUMENTS

| | | | |
|---|---|---|---|
| 8,381,349 B2 | 2/2013 | Ku | |
| 8,756,748 B2 | 6/2014 | Erdal | |
| 9,045,113 B2* | 6/2015 | Aznag | ..................... B60S 1/386 |
| 2014/0000055 A1* | 1/2014 | Verelst | .................. B60S 1/4003 |
| | | | 15/250.32 |
| 2014/0033466 A1 | 2/2014 | Obert et al. | |
| 2014/0068887 A1 | 3/2014 | Lee | |
| 2014/0082875 A1* | 3/2014 | Peers | .................... B60S 1/3801 |
| | | | 15/250.32 |
| 2015/0375716 A1 | 12/2015 | An | |

FOREIGN PATENT DOCUMENTS

| | | | |
|---|---|---|---|
| DE | 2415180 | * | 10/1975 |
| DE | 102011007248 A1 | | 10/2012 |
| FR | 2781742 | * | 2/2000 |
| KR | 2010005707 U | | 6/2010 |
| TW | M288872 U | | 3/2006 |
| WO | 2015007179 A1 | | 1/2015 |

OTHER PUBLICATIONS

Chinese Patent Office (CNIPA), Office Action (with English translation) for corresponding Chinese Patent Application No. 201980081097.4, dated Apr. 26, 2023.

* cited by examiner

ADAPTER FOR A WIPER BLADE MOUNTING OF A MOTOR VEHICLE

CROSS-REFERENCE TO RELATED APPLICATIONS

This is a 371 application (submitted under 35 U.S.C. § 371) of International Application No. PCT/EP2019/084280 (WO2020136002) filed on Dec. 9, 2019, which claims the priority date benefit of French Application No. FR1874275 filed on Dec. 27, 2018, the disclosures of which are hereby incorporated by reference in their entirety.

TECHNICAL FIELD

The present invention relates to the field of the wiper blades of a motor vehicle window, and more particularly to adapters for fastening a wiper blade mounting to a wiper arm.

In the field of motor vehicles, wiper systems are known that make it possible to wipe a glazed panel of a motor vehicle. Generally, such wiper systems comprise one or more wiper blades that are articulated so that they can be moved against the glazed panel. Each wiper blade comprises a wiper rubber suitable for being placed in contact with the glazed panel so that it can remove the water from the glazed panel, and an articulated arm that makes it possible to keep the wiper rubber in contact with the glazed panel and to generate a pendulum movement against the glazed panel.

BACKGROUND

More particularly, the wiper rubber is held by a mounting that is attached to the articulated arm. In order to facilitate maintenance operations, the mounting is removably fastened to the articulated arm by means of an adapter rigidly connected to the mounting and configured so that it is connected to the articulated arm by means of at least one pivot connection.

Of course, there is a multitude of existing adapters, depending on the motor vehicle in question, the shapes and dimensions of the different mountings and their wiper rubbers, as well as on the types of articulated arm to which the mountings are intended to be connected. This wide variety of mountings and articulated arms thus leads to the design of a great many different adapters so that each mounting can be fitted to the different types of articulated arm, resulting in increased production costs due to the multiple runs of different parts to be manufactured. In addition, this situation makes the replacement market more complex for occasional repairers, as both a wiper blade mounting and the adapter corresponding to the articulated arm installed on the motor vehicle must be purchased.

There is thus a need for simplification and rationalization of the devices allowing the replacement of the wiper rubbers on a motor vehicle.

In addition, the assembly of the adapters on the wiper blade mountings is sometimes unintuitive for a private individual on the replacement market to implement. One technical problem addressed by the present invention is therefore that of allowing easier assembly of the adapter on the wiper blade mounting, and of preventing said adapter from being assembled back to front on said mounting.

The object of the present invention is to overcome at least a large number of the problems set out above and also to result in other advantages by proposing a novel adapter for fastening a wiper blade mounting to an articulated wiper blade arm.

Another aim of the present invention is to facilitate the connection of such an adapter to several types of articulated wiper blade arm.

A further aim of the present invention is to reduce the manufacturing costs of such an adapter.

SUMMARY

According to a first aspect of the invention, at least one of the aforementioned aims is achieved with an adapter for fastening a wiper blade mounting to an articulated wiper blade arm, the adapter comprising (i) a cover configured to be removably fastened to a main cross-bar of the wiper blade mounting, and (ii) a device for assembling the cover on a main cross-bar of the wiper blade mounting, said assembly device comprising an angular indexing system configured to allow the assembly of the cover on the main cross-bar by rotation of said cover relative to said main cross-bar.

The angular indexing system of the adapter cover according to the first aspect of the invention thus makes it possible to assembly the cover of said adapter on the main cross-bar of the wiper blade mounting by implementing a rotating movement of the cover relative to the main cross-bar, as will be described in greater detail below in the fourth aspect of the invention. At the end of the rotating movement of the cover relative to the main cross-bar, the cover interacts with the main cross-bar by engagement of complementary shapes; it is then rigidly connected to said main cross-bar, in a detachable manner.

Consecutively, the cover can thus be customized depending on the type of wiper blade with which it is intended to interact. In other words, the cover can be designed specifically according to a type of fastening of the wiper blade to the adapter.

The invention according to the first aspect of the invention is more particularly intended for the replacement market for wiper systems and/or wiper blades and/or adapters for such wiper blades.

In the context of the invention, the following adjectives are defined relative to the cover of the adapter according to the first aspect of the invention:

the adjective "longitudinal" refers to a direction of extension of the cover along its greatest length. When the adapter is assembled on a wiper blade, the longitudinal direction refers to the axis formed by the wiper rubber. By extension, the longitudinal direction refers to a direction that is parallel or substantially parallel to the greatest length of the wiper rubber, and the adjectives "front" and "rear" refer to a relative position along the longitudinal axis;

the adjective "transverse" or "lateral" refers to a direction extending perpendicular to the longitudinal direction, and more particularly a direction perpendicular to two longitudinally extending lateral sides of the cover. When the adapter is coupled to a wiper blade mounting, a longitudinal axis and a transverse axis of the cover together form a plane parallel to a bearing surface of the cover on the wiper blade mounting;

the adjective "vertical" refers to a direction that is simultaneously perpendicular to the longitudinal direction and the transverse direction. By way of example, a vertical direction refers in particular to the relative position of the cross-bar of a wiper blade mounting in relation to the cover of the adapter according to the first aspect of the invention. By extension, the adjectives "lower" and "upper" refer to a relative position along the vertical axis.

The adapter according to the first aspect of the invention can advantageously comprise at least one of the following refinements, and the technical features forming these refinements can be considered individually or in combination:

- the cover comprises a central opening laterally delimited by two lateral sides and housing a system for attaching the articulated wiper blade arm to the adapter according to the first aspect of the invention. This advantageous configuration thus makes it possible to cleverly house the attachment system in the central opening in order to limit the footprint of the cover. In addition, the central opening makes it possible, depending on the different types of coupling between the adapter and the articulated arm, to house a plurality of different types of attachment system;
- the attachment system comprises a pivot connection rod that extends transversely across the central opening between the two lateral sides of the cover. This advantageous configuration thus makes it possible to couple the adapter to the articulated arm about a pivot connection that in turn makes it possible to improve the pressing of the wiper blade against the glazed panel of the motor vehicle;
- according to a first variant embodiment, the system for attaching the articulated wiper blade arm to the adapter according to the first aspect of the invention is integrally formed with the cover. In the context of the invention, the expression "integrally formed" means that the attachment system and the cover are formed in the same manufacturing process and cannot be separated from each other without damaging one and/or the other of them. In this first variant embodiment, a plurality of covers can be designed as a function of a plurality of types of attachment system, depending on the corresponding articulated wiper blade arms. Alternatively, according to a second variant embodiment, the attachment system is removable and attached to the cover by means of temporary fastening means. In this second variant embodiment, the cover is standardized and only the attachment system is designed depending on the articulated wiper blade arm with which it is intended to be associated;
- the adapter assembly device according to the first aspect of the invention is configured to allow the rotation of the cover relative to the main cross-bar with which the adapter according to the first aspect of the invention is intended to interact and along the vertical axis of said cover;
- the adapter assembly device according to the first aspect of the invention is situated on a face of the cover that presses on the main cross-bar of the wiper blade mounting with which the adapter according to the first aspect of the invention is intended to interact. This advantageous configuration makes it possible to facilitate the placing in contact of the cover with the main cross-bar and, consecutively, to facilitate the assembly of the adapter according to the first aspect of the invention on the wiper blade mounting;
- the assembly device of the adapter according to the first aspect of the invention is situated longitudinally in the central opening of the cover. The assembly device of the adapter according to the first aspect of the invention is situated laterally between inner faces of the two lateral sides of the cover. More particularly, the angular indexing system is situated longitudinally in the main opening of the cover, and preferably in line with the attachment system. In addition, the angular indexing system is advantageously laterally centered relative to the lateral sides of the cover. According to a first alternative, the assembly device and/or the indexing system is/are longitudinally centered between two longitudinal ends of the cover. According to a second alternative, the assembly device and/or the angular indexing system is longitudinally off-center relative to the longitudinal ends of the cover in order to facilitate assembly and allow the indexing of the direction of assembly of the cover on the main cross-bar;
- the angular indexing system of the assembly device comprises (i) a shaft that extends protruding relative to a bearing face of the cover; and/or (ii) a vertical locking member situated at a free end of the shaft of the angular indexing system, the vertical locking member being configured to adopt a first angular configuration in which the vertical locking member allows the insertion of the cover into the main cross-bar and a second angular configuration in which the vertical locking member allows the rigid connection of the cover to the main cross-bar. Thus, according to a first variant embodiment, the angular indexing system only comprises the shaft in order to define an axis of rotation of the cover of the adapter relative to the main cross-bar of the wiper blade mounting with which the adapter according to the first aspect of the invention is intended to interact. According to a second variant embodiment, the shaft of the angular indexing system is supplemented by the vertical locking member situated at the free end of the shaft in order to make it possible to assemble the cover of the adapter on the cross-bar of the mounting by engagement of complementary shapes. More particularly, in either of the variant embodiments, the shaft of the angular indexing system takes the form of a cylindrical boss that extends vertically protruding above and below the bearing face of the cover;
- the vertical locking member of the angular indexing system comprises (i) a first boss that extends perpendicularly relative to the shaft of said angular indexing system and (ii) a second boss that extends perpendicularly relative to the shaft of said angular indexing system. Thus, in a plane longitudinal to the cover of the adapter according to the first aspect of the invention, the bosses and the shaft of the vertical locking member together form a T-shaped profile, in order to facilitate the anchoring of the cover on the main cross-bar with which the adapter according to the first aspect of the invention is intended to interact;
- advantageously, the first boss and the second boss of the vertical locking member of the angular indexing system are situated symmetrically relative to the shaft of said angular indexing system. More particularly, the first boss and the second boss of the vertical locking member of the angular indexing system are distributed diametrically opposite each other relative to the shaft of said angular indexing system. According to a first variant embodiment, the first boss and the second boss of the vertical locking member of the angular indexing system extend longitudinally relative to the cover of the adapter according to the first aspect of the invention. According to a second variant embodiment that is an alternative to the first variant embodiment, the first boss and the second boss of the vertical locking member of the angular indexing system extend transversely relative to the cover of the adapter according to the first aspect of the invention;

in order to facilitate the engagement of the vertical locking member of the angular indexing system with the main cross-bar with which the adapter according to the first aspect of the invention is intended to interact, the vertical locking member of the angular indexing system comprises a locking face situated facing the bearing face of the cover. In other words, the locking face of the vertical locking member of the angular indexing system is situated at a—non-zero—distance from the bearing face of the cover, and preferably below said bearing face relative to the vertical axis of the cover. Preferably, the locking face of the vertical locking member is parallel to the bearing face of the cover;

in order to facilitate the rotation of the cover relative to the main cross-bar on assembly of the adapter according to the first aspect of the invention on the wiper blade mounting, the first and second bosses of the vertical locking member of the angular indexing system are longitudinally delimited by a circular face;

in a particular manner, the vertical locking member of the angular indexing system comprises a locking face situated facing the bearing face of the cover, and the first and second bosses of the vertical locking member of the angular indexing system are longitudinally delimited by a circular face;

the circular faces of the first and second bosses of the vertical locking member are each defined by a first radius and by a second radius respectively, relative to the axis of said vertical locking member. This advantageous configuration makes it possible to facilitate the rotation of the cover about the axis of the vertical locking member. The first radius of the circular face of the first boss of the vertical locking member is advantageously equal to the second radius of the circular face of the second boss of said vertical locking member;

the first boss is prismatic and laterally delimited by two flat, parallel lateral sides; the second boss is laterally delimited by two flat lateral sides forming an angle greater than 0° between them, and preferably between 20° and 45°;

the angular indexing system of the cover of the adapter according to the first aspect of the invention comprises a lateral keying member configured to allow the lateral alignment of the cover on the main cross-bar with which the adapter according to the first aspect of the invention is intended to interact. In other words, the keying member makes it possible to rigidly connect the cover to the main cross-bar when said cover reaches a predetermined angular configuration: the lateral keying member makes it possible to lock said cover laterally and in this predetermined angular configuration relative to said main cross-bar. The predetermined angular configuration is defined by the lateral keying member, exemplary embodiments of which are described below;

the lateral keying member of the angular indexing system comprises at least one—and preferably two—lateral stop situated on at least one lateral side of the cover. In particular, the lateral keying member of the angular indexing system comprises a first lateral stop situated on a first lateral side of the cover and a second lateral stop situated on a second lateral side opposite the first lateral side of the cover;

the first lateral stop is situated at a first longitudinal end of the first lateral side of the cover, and the second lateral stop is situated at a second longitudinal end of the second lateral side, said second longitudinal end being situated on the opposite side to the first longitudinal end of the first lateral side of the cover. This asymmetrical configuration relative to the longitudinal axis of the cover makes it possible to prevent said cover from being assembled back to front on the main cross-bar with which the adapter according to the first aspect of the invention is intended to interact;

each lateral stop forming the lateral keying member of the angular indexing system takes the form of a tab having an L-shaped transverse profile, said lateral stop comprising a longitudinally extending boss that extends protruding from the bearing face of the cover and a lip situated at a distal end of the longitudinally extending boss, said lip extending laterally relative to said longitudinally extending boss. In particular, the lip of each lateral stop extends towards the opposite lateral side of the cover in order to allow engagement with the main cross-bar with which the adapter according to the first aspect of the invention is intended to interact on the rotating movement of the cover relative to said main cross-bar;

due to the L-shaped transverse profile of the lateral stops, the lip of each lateral stop comprises a locking surface situated facing the bearing face of the cover. The locking surface is suitable for interacting with the main cross-bar, and more particularly for being pressed vertically against a complementary face of the main cross-bar. This advantageous configuration makes it possible to lock the cover against the main cross-bar;

in a particular manner, the lip of each lateral stop extends towards the opposite lateral side of the cover and comprises a locking surface situated facing the bearing face of the cover. In other words, the locking surface of the lip of the lateral stops forming the lateral keying member of the angular indexing system is situated at a distance from the bearing face of the cover, and preferably below said bearing face relative to the vertical axis of the cover. Advantageously, the locking surface of the lateral keying member is parallel to the bearing face of the cover;

the locking surface of the lateral keying member is parallel to the locking face of the vertical locking member. Preferably, the locking surface of the lateral keying member and the locking face of the vertical locking member are coplanar;

a lower face of the lateral keying member—and preferably a lower face of the lip of each lateral keying member—is parallel to the bearing face of the cover;

the lip of each lateral keying member comprises a lateral bearing face parallel to the corresponding lateral side of the cover. The lateral bearing face of the lip of the keying members makes it possible to define an angular abutment position of the cover against the main cross-bar, thus defining an assembled configuration of the adapter according to the first aspect of the invention on the wiper blade mounting. Alternatively, the lateral bearing face of the lip of each lateral keying member forms a non-zero angle relative to the corresponding lateral side of the cover;

the adapter according to the first aspect of the invention or the cover and/or the assembly device are made from plastic in order to reduce the manufacturing costs. By way of non-limiting example, the cover of the adapter and/or the assembly device are obtained by molding.

According to a second aspect of the invention, a motor vehicle wiper blade is proposed comprising an adapter according to the first aspect of the invention or according to any one of the refinements thereof, and a wiper blade mounting, the mounting comprising (i) a main cross-bar to which the adapter is removably fastened and (ii) two secondary cross-bars fastened to the main cross-bar and supporting a wiper rubber.

The adapter according to the first aspect of the invention is thus coupled to the mounting on the main cross-bar thereof, in order to allow the subsequent coupling of the wiper blade with an articulated wiper system arm. It is thus possible, as explained above, using a single locking flap, to choose the cover that corresponds to the corresponding articulated arm, in order to make the wiper blade according to the second aspect of the invention compatible with a plurality of types of wiper system, at a lower cost.

The wiper blade according to the second aspect of the invention can advantageously comprise at least one of the following refinements, and the technical features forming these refinements can be taken individually or in combination:

- the main cross-bar comprises a bearing platform against which the bearing face of the cover is pressed. This configuration makes it possible to position the cover accurately against the main cross-bar. It also makes it possible to connect the cover to the main cross-bar more rigidly;
- the bearing platform of the main cross-bar comprises an opening configured to allow the engagement of the shaft and the vertical locking member of the angular indexing system of the cover of the adapter according to the first aspect of the invention or according to any one of the refinements thereof. The opening of the bearing platform thus interacts with the vertical locking member of the cover, in order to allow the assembly of said cover on the main cross-bar. In particular, the opening of the bearing platform is configured to receive the vertical locking member of the cover in order to vertically lock the cover of the adapter according to the first aspect of the invention relative to the main cross-bar of the wiper blade mounting. Advantageously, the opening is situated longitudinally in the center or near the center of the main cross-bar, and more particularly in the center or near the center of the bearing platform of the main cross-bar;
- according to a particularly advantageous embodiment of the invention, the main cross-bar comprises a bearing platform against which the bearing face of the cover is pressed, said bearing platform of the main cross-bar comprising an opening configured to allow the engagement of the shaft and the vertical locking member of the angular indexing system;
- in order to facilitate the engagement of the vertical locking member of the cover of the adapter according to the first aspect of the invention or according to any one of the refinements thereof, the shape of the opening corresponds to a homothetic transformation of the enlargement type of the shape of the shaft and of the vertical locking member of the angular indexing system. This advantageous configuration also makes it possible to insert said shaft and said vertical locking member into the opening with play;
- according to a first variant embodiment, the opening of the main cross-bar is oriented transversely between two lateral edges of the bearing platform of the main cross-bar. This first variant embodiment is particularly beneficial when the vertical locking member of the cover of the adapter according to the first aspect of the invention is oriented longitudinally between two longitudinal ends of said cover. According to a second variant embodiment, the opening of the main cross-bar is oriented longitudinally between two longitudinal ends of the bearing platform of the main cross-bar. This second variant embodiment is particularly beneficial when the vertical locking member of the cover of the adapter according to the first aspect of the invention is oriented transversely between the two lateral sides of said cover;
- the opening passes through the bearing platform of the main cross-bar, towards a lower face of said main cross-bar. In other words, the opening passes through the main cross-bar from one side to the other, relative to the vertical axis;
- the main cross-bar comprises a recess for indexing the cover of the adapter relative to said main cross-bar, the indexing recess being radially delimited by a cylindrical wall and vertically delimited by the bearing platform. The indexing recess thus forms a hollow recess into which the vertical locking member of the cover can be inserted during the operation to assemble the adapter according to the first aspect of the invention on the mounting of the wiper blade;
- between the cylindrical wall of the indexing recess of the main cross-bar, a vertical thickness of the bearing platform of the main cross-bar is substantially equal to the distance separating the locking face of the vertical locking member of the angular indexing system and the bearing face of the cover. This advantageous configuration makes it possible to lock the cover vertically on the main cross-bar in the second angular configuration of the angular indexing system, by friction between the locking face of the vertical locking member of the angular indexing system and a lower face of the bearing platform in line with the indexing recess of the main cross-bar;
- the indexing recess of the main cross-bar comprises at least one indexing stop configured to interact with the vertical locking member of the angular indexing system of the cover of the adapter, in order to configure said vertical locking member in its second angular configuration. The at least one indexing stop is situated radially inside the cylindrical wall forming the indexing recess. In particular, the indexing recess of the main cross-bar comprises two indexing stops diametrically opposite each other, each indexing stop comprising a lateral face facing the other and interacting with the corresponding lateral edge of the associated boss of the vertical locking member of the angular indexing system of the cover of the adapter. The indexing stops thus make it possible to achieve the angular locking of the cover of the adapter according to the first aspect of the invention against the main cross-bar of the wiper blade mounting. In other words, the indexing stops make it possible to define the second angular configuration of the cover on the cross-bar as described above;
- the bearing platform of the main cross-bar comprises at least one lateral keying recess configured to allow engagement with the lateral keying member of the angular indexing system of the cover of the adapter. In particular, the bearing platform comprises (i) a first lateral keying recess interacting with the first lateral stop of the keying member, the first lateral keying recess being situated on a first lateral edge of the bearing platform, and (ii) a second lateral keying recess interacting with the second lateral stop of the keying member, the second lateral keying recess being situated on a second lateral edge opposite the first lateral edge of the bearing platform;

the first lateral keying recess is situated at a first longitudinal end of the first lateral edge of the bearing platform, and the second lateral keying recess is situated at a second longitudinal end of the second lateral edge of the bearing platform, said second longitudinal end being situated on the opposite side to the first longitudinal end of the first lateral edge of the bearing platform;

each lateral keying recess interacting with the keying member of the angular indexing system of the cover of the adapter is delimited by:

a lower surface situated vertically at a distance from the bearing platform that is greater than the distance vertically separating the lower face of the lateral keying member of the cover from the bearing face of said cover; and/or a lateral bearing surface situated set back relative to the lateral edge of the bearing platform, said lateral bearing surface of each lateral keying recess being suitable for being pressed against the lateral bearing face of the lip of each lateral stop forming the lateral keying member of the angular indexing system of the cover of the adapter; and/or two longitudinal edges allowing the insertion of the lateral keying member of the angular indexing system of the cover of the adapter into the corresponding lateral keying recess, by a rotating movement about the shaft of said angular indexing system;

each lateral keying recess comprises an oblong slot that extends longitudinally in the lateral bearing surface, so as to allow the insertion of the lip into said slot by a rotating movement about the shaft of the angular indexing system of the cover of the adapter. Continuing on laterally from the oblong slot of each keying recess of the main cross-bar, a vertical thickness of the bearing platform of the main cross-bar is substantially equal to the distance separating the locking surface of the lip of the lateral stops forming the lateral keying member of the angular indexing system and the bearing face of the cover. This advantageous configuration makes it possible to lock the cover angularly on the main cross-bar in the second angular configuration of the angular indexing system, by friction between the locking surface of the member of the lip of the lateral stops forming the lateral keying member of the angular indexing system of the cover of the adapter and a lower face of the bearing platform in line with the oblong slot of the main cross-bar;

the main cross-bar of the wiper blade mounting is made from plastic and/or the secondary cross-bars are advantageously made from plastic in order to reduce the weight and/or manufacturing cost thereof.

According to a third aspect of the invention, a wiper system is proposed comprising at least one articulated arm detachably fastened to the adapter of the wiper blade according to the second aspect of the invention or according to any one of the refinements thereof, each articulated arm being rotatably mobile about an axis of rotation and according to a movement controlled by a motor.

More particularly, each articulated arm is connected to the adapter of the wiper blade by means of the attachment system of said adapter, said attachment system preferably forming one or more pivot connection rods as described above. This advantageous configuration thus makes it possible to improve the contact of the wiper rubber on the glazed panel when the wiper system is implemented on a motor vehicle, for example. In addition, it is thus possible to detach the wiper blade easily and, by adapting the removable attachment system, to make a single wiper blade compatible with a plurality of different articulated arms.

According to a fourth aspect of the invention, a method is proposed for assembling the adapter according the first aspect of the invention or according to any one of the refinements thereof, on the main cross-bar of a wiper blade according to the second aspect of the invention or according to any one of the refinements thereof, the assembly method comprising the following steps:

a step of inserting the angular indexing system of the cover of the adapter into the opening of the main cross-bar of the wiper blade mounting, said angular indexing system being configured, in the opening, and optionally in the indexing recess, in its first angular configuration. In particular, the shaft and the vertical locking member of the angular indexing system of the cover are inserted vertically—and with transverse and/or longitudinal play—into the opening of the main cross-bar. In other words, the cover is pivoted—preferably about its vertical axis—so that the angular indexing system is aligned with the opening of the main cross-bar in order to allow the insertion thereof, due to their complementary respective shapes;

a step of pressing the cover of the adapter against the main cross-bar of the wiper blade mounting. More particularly, the bearing face of the cover is pressed against the bearing platform of the main cross-bar by a translational movement of the cover relative to the main cross-bar, preferably along the vertical axis. During this pressing step, the shaft and the vertical locking member of the angular indexing system of the cover are inserted into the indexing recess of the main cross-bar;

following the pressing step, a step of rotating the cover relative to the main cross-bar in order to configure the angular indexing system of said cover in the indexing recess of said main cross-bar in its second angular configuration, as described above. In this rotation step, the cover is kept pressed against the main cross-bar. More particularly, the cover is advantageously pivoted about the shaft of the angular indexing system in order to cause the shaft and the vertical locking member of the angular indexing system of the cover to pivot relative to the opening of the main cross-bar, so as to prevent it being possible to detach the cover from the main cross-bar by a simple vertical movement. In this second angular configuration of the angular indexing system relative to the indexing recess of the cross-bar, the cover is preferably pivoted through an angle of between 30° and 120°, advantageously equal to 90°, so that the vertical locking member is pivoted through an angle of between 30° and 120°, and preferably equal to 90°, relative to the opening;

during the step of rotating the cover relative to the main cross-bar, a step of engaging the lips of the lateral stops forming the lateral keying member of the cover in the corresponding oblong slots of the lateral keying recesses of the main cross-bar;

at the end of the rotation step, and after the engagement step, a step of laterally abutting the cover against the main cross-bar. In particular, the lateral abutment step comprises a step of laterally abutting the angular indexing system of the cover in the indexing recess of the main cross-bar. More specifically, the lateral edges of the bosses of the vertical locking member of the angular indexing system of the cover are pressed against the lateral faces of the indexing stops housed in the indexing recess of the main cross-bar.

Various embodiments of the invention are envisaged, incorporating the different optional features set out herein according to all of the possible combinations.

BRIEF DESCRIPTION OF THE DRAWINGS

Further features and advantages of the invention will become apparent from the following description and from several embodiments given as non-limiting examples with reference to the attached schematic drawings, in which.

Of course, the features, variants and different embodiments of the invention can be combined with one another, in various combinations, provided that they are not incompatible or mutually exclusive. In particular, variants of the invention can be envisaged that comprise only a selection of the features described below in isolation from the other features described, if this selection of features is sufficient to provide a technical advantage or to distinguish the invention from the prior art.

In particular, all of the variants and all of the embodiments described can be combined with each other if there is no technical reason preventing this combination.

In the figures, elements common to a number of figures keep the same reference.

DETAILED DESCRIPTION

In the following description of the figures, the adjective "longitudinal" refers to the X axis and corresponds to a direction of extension of the cover along its greatest length. Hereinafter, the adjectives "front" and "rear" respectively refer to the left-hand and right-hand sides of the figures shown. The adjective "transverse" or "lateral" refers to the Y axis and corresponds to a direction extending perpendicularly to the longitudinal direction, and the adjective "vertical" refers to the Z axis and corresponds to a direction that is simultaneously perpendicular to the longitudinal direction and the transverse direction. The adjectives "lower" and "upper" refer respectively to the lower and upper edges of the figures shown.

Figure 1A:
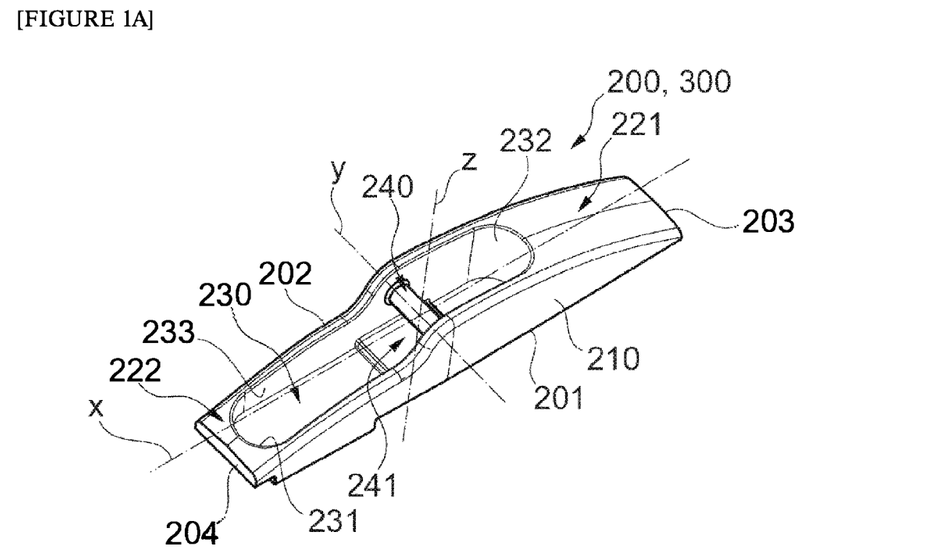
FIGS. 1A and 1B illustrate perspective views of an exemplary embodiment of a cover of an adapter according to the first aspect of the invention.
Figure 1B:
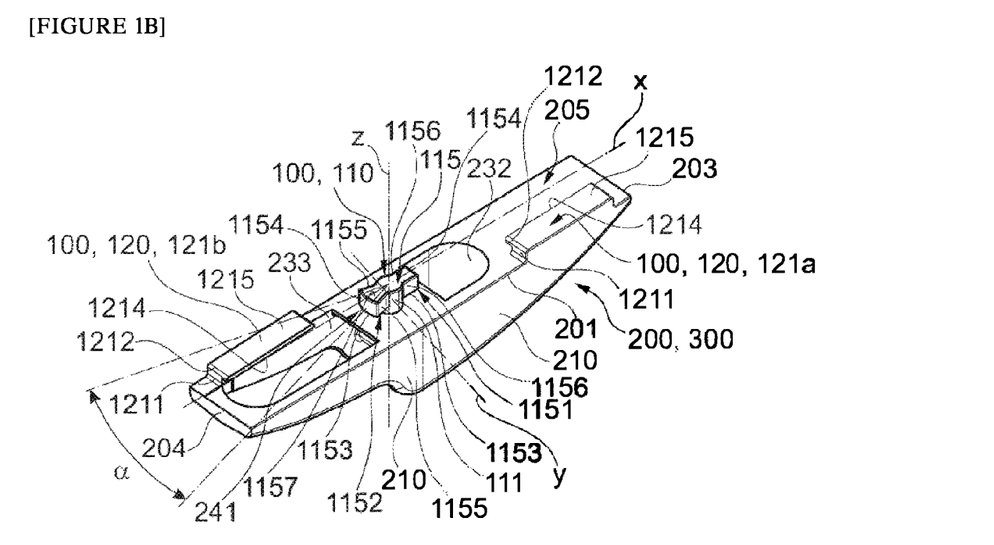
Figure 1C:
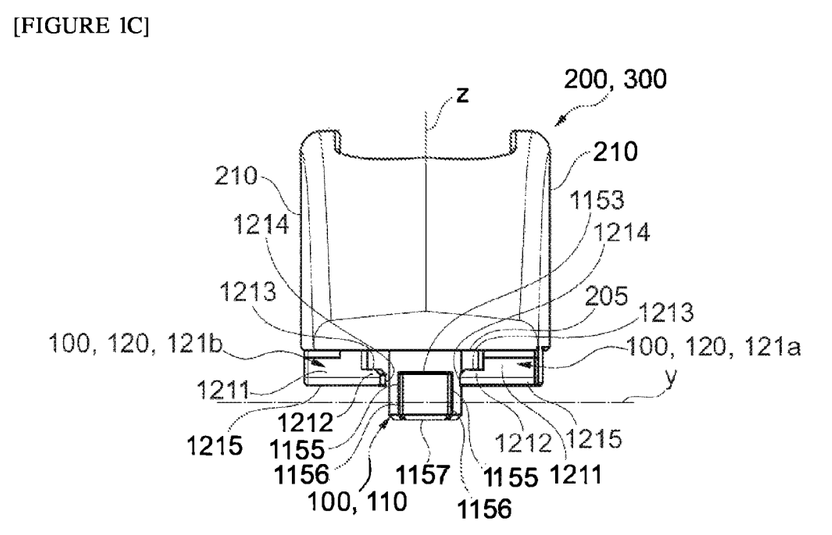
FIG. 1C illustrates a profile view along a transverse plane of the cover illustrated in FIGS. 1A and 1B.

With reference to FIGS. 1A to 1C, the invention according to a first aspect thereof relates to an adapter 300 for fastening a wiper blade 500 mounting 400 to an articulated wiper blade arm. The adapter 300 according to the first aspect of the invention comprises a cover 200 configured to be removably fastened to a main cross-bar 410 of the wiper blade 500 mounting 400, and a device 100 for assembling the cover 200 on the main cross-bar 410 of the wiper blade 500 mounting 400, the assembly device 100 comprising an angular indexing system 110 configured to allow the assembly of the cover 200 on the main cross-bar 410 by rotating said cover 200 relative to said main cross-bar 410.

The cover 200 of the adapter 300 according to the first aspect of the invention takes the form of a keyhole module extending along the longitudinal axis X. The cover 200 has an elongated, narrow shape: it extends longitudinally between a rear face 203 and a front face 204, and is laterally delimited by two lateral sides 210. The two lateral sides 210 are advantageously parallel. Relative to the vertical axis Z, the cover 200 is delimited by a lower edge 201 and an upper edge 202.

The lower edge 201 of the cover 200 forms a bearing face 205 suitable for being pressed against the main cross-bar 410 of the wiper blade mounting 400 when the corresponding adapter 300 is coupled to said mounting 400. The bearing face 205 is advantageously flat; in addition, it extends along a horizontal plane formed by the longitudinal axis X and the transverse axis Y. In other words, the bearing face 205 is substantially perpendicular to the lateral sides 210 of the cover 200. The upper edge 202 of the cover 200 forms a curved surface, required due to aerodynamic considerations and to allow optimum coupling of the articulated wiper blade arm to the adapter 300.

Between its two lateral sides 210, the cover 200 comprises an oblong central opening 230. The central opening 230 is a through-opening: it opens out simultaneously on the upper edge 202 and the lower edge 201 of the cover 200. The central opening 230 of the cover 200 is longitudinally delimited by two curved surfaces forming front and rear flanks 231 and 232 of said central opening 230. Laterally, the central opening 230 of the cover 200 is delimited by inner faces 233 of the lateral sides 210 of the cover 200.

Longitudinally, the cover 200 comprises a front nose 222 and a rear nose 221 that together frame the central opening 230 relative to the longitudinal axis X. In other words, the rear nose 221 is situated between the central opening 230 and the rear face 203 of the cover 200, and the front nose 222 is situated between the central opening 230 and the front face 204 of the cover 200. As can be seen in FIG. 1A respectively, the front and rear noses 222 and 221 of the cover 200 form a solid surface on the upper edge 202 of said cover 200. This advantageous configuration makes it possible to improve the aerodynamic performance of the adapter when it is assembled on the mounting 400 of a wiper blade.

In order to interact with the arm of the wiper blade with which the adapter 300 according to the first aspect of the invention is intended to interact, the cover 200 comprises a pivot connection rod 240. The pivot connection rod 240 extends laterally between the two lateral sides 210 of the cover 200. More particularly, the pivot connection rod extends laterally across the central opening 230 and between the inner faces 233 of the lateral sides 210.

Figure 3A:
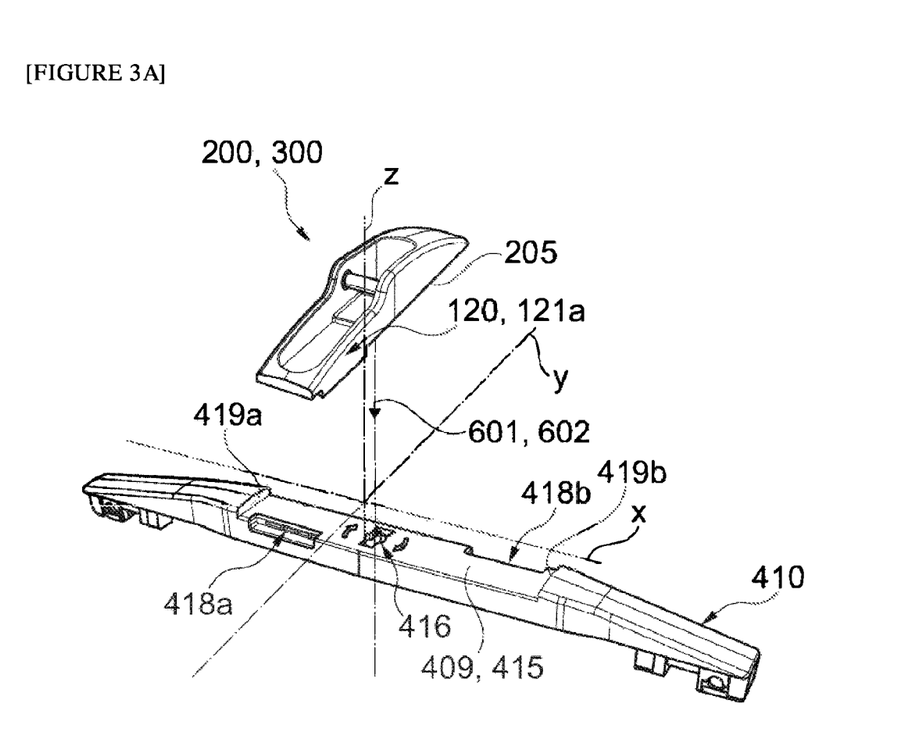
FIGS. 3A, 3B and 3C illustrate the steps of assembling the adapter according to the first aspect of the invention on the main cross-bar of a wiper blade mounting, according to the fourth aspect of the invention.
Figure 3B:
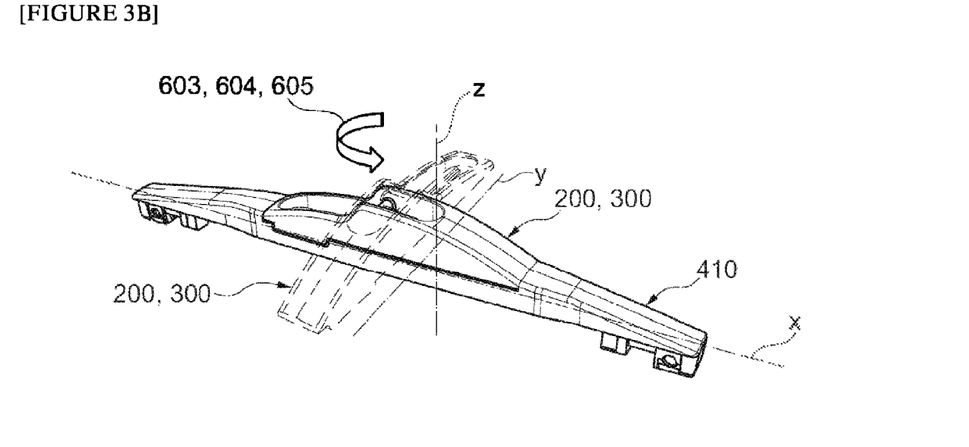
Figure 3C:
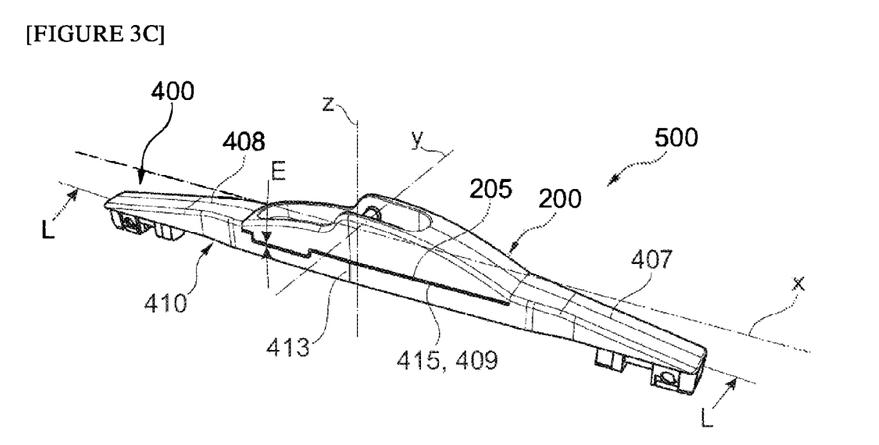

In order to allow the mechanical coupling of the adapter 300 to the main cross-bar 410 of the wiper blade 500 mounting 400 with which it is intended to interact, the angular indexing system 110 of the assembly device 100 comprises:
- a shaft 111 that extends protruding relative to the bearing face 205 of the cover 200; and
- a vertical locking member 115 situated at a free end of the shaft 111, in order to allow mechanical coupling to the main cross-bar 410, as will be described below with reference to FIGS. 3A, 3B and 3C.

The shaft 111 of the angular indexing system 110 takes the form of a cylindrical boss that extends vertically protruding above and below the bearing face 205 of the cover 200, on a platform 241 that extends laterally between the two lateral sides 210 of the cover and in line with the pivot connection rod 240.

In the example illustrated in FIGS. 1A to 1C, the vertical locking member 115 comprises:
- a first boss 1151 that extends perpendicularly relative to the shaft 111 of the angular indexing system 110; and
- a second boss 1152 that extends perpendicularly relative to the shaft 111 of the angular indexing system 110.

Thus, in a plane longitudinal to the cover 200, the bosses 1151, 1152 and the shaft 111 of the vertical locking member 110 together form a T-shaped profile that makes it possible to facilitate the anchoring of the cover 200 on the main cross-bar 410 with which the adapter 300 is intended to interact.

The first boss 1151 and the second boss 1152 are situated symmetrically relative to the shaft 111 of the angular indexing system 110: they are distributed in a diametrically opposite manner relative to the shaft 111 of said angular indexing system 110. More particularly, the first boss 1151 and the second boss 1152 of the vertical locking member 115 extend along the longitudinal axis X of the cover 200.

Each boss 1151, 1152 of the vertical locking member 115 comprises a locking face 1153 that makes it possible to interact with the main cross-bar 410. The locking face 1153 of the vertical locking member 115 is situated at a non-zero distance from the bearing face 205 of the cover 200, relative to the vertical axis Z. The locking face 1153 of the vertical locking member 115 is situated facing the bearing face 205 of the cover 200. In the example illustrated in FIGS. 1A to 1C, the locking face 1153 of the vertical locking member 115 is parallel to the bearing face 205 of the cover 200.

Relative to the longitudinal axis X, the first boss 1151 and the second boss 1152 of the vertical locking member 115 are delimited by a circular face 1154. In the example illustrated in FIGS. 1A to 1C, the circular faces 1154 of the first and second bosses 1151 and 1152 of the vertical locking member 115 share the same radius: together they form a cylindrical surface that extends about the shaft 111 of said vertical locking member 115.

Vertically, the vertical locking member 115 is delimited by a flat lower face 1157 parallel to the bearing face 205 of the cover 200. Advantageously, and as can be seen in FIG. 1B, the lower face 1157 of the vertical locking member 115 forms a single flat surface common to the two bosses 1151, 1152 of said vertical locking member 115.

The first boss 1151 of the vertical locking member 115 is prismatic: it is laterally delimited by two flat, parallel lateral sides 1156. Advantageously, the lateral sides 1156 of the first boss 1151 are parallel to the lateral sides 210 of the cover 200.

The second boss 1152 of the vertical locking member 115 is laterally delimited by two flat lateral edges 1155 that are not parallel: they form an angle α that is greater than 0° and approximately equal to 30° in the example illustrated in FIGS. 1A to 1C.

In order to allow the lateral alignment of the cover 200 on the main cross-bar 410 with which the adapter 300 is intended to interact, the angular indexing system 110 of the cover 200 comprises a lateral keying member 120; the lateral keying member 120 makes it possible to rigidly connect the cover 200 to the main cross-bar 410 when said cover 200 has been configured in a predetermined angular locking configuration, as will be described with reference to FIGS. 3A, 3B and 3C.

To this end, the lateral keying member 120 comprises two lateral stops 121a, 121b each situated on one of the lateral sides 210 of the cover 200: a first lateral stop 121a is situated on a first lateral side 210 of the cover 200 and a second lateral stop 121b is situated on a second lateral side 210 opposite the first lateral side 210. More particularly, each of the lateral stops 121a, 121b forming the lateral keying member 120 is situated near a longitudinal end of the cover 200: the first lateral stop 121a is situated longitudinally at the rear face 203 of the cover 200, and the second lateral stop 121b is situated longitudinally at the front face 204 of the cover 200. This asymmetrical distribution of the lateral stops 121a, 211b relative to the longitudinal axis X of the cover 200 makes it possible to engage the lateral stops with the main cross-bar 410 with which the adapter 300 is intended to interact by a simple rotating movement.

As can be seen in FIGS. 1B and 1C, each lateral stop 121a, 121b forming the lateral keying member 120 of the angular indexing system 110 takes the form of a tab having an L-shaped transverse profile. Each lateral stop 121a, 121b comprises:
- a longitudinally extending boss 1211 that extends protruding from the bearing face 205 of the cover 200; and
- a lip 1212 situated at a distal end of the longitudinally extending boss 1211 that extends laterally relative to the longitudinally extending boss 1211.

Vertically, the lateral keying member 120 is delimited by a lower face 1215. The lower face 1215 vertically defines in particular the lip 1212 of each lateral stop 121a, 121b forming the lateral keying member 120. As can be seen in FIGS. 1B and 1C, the lower face 1215 of the lateral keying member 120 is parallel to the bearing face 205 of the cover 200.

The lip 1212 of each lateral stop 121a, 121b comprises a locking surface 1213 situated facing the bearing surface 205 of the cover 200. The locking surface 1213 is suitable for interacting with the main cross-bar 410 in order to press vertically against a complementary face of the main cross-bar 410 in order to mechanically couple the cover 200 to the main cross-bar 410 by friction. The locking surface 1213 of the lips 1212 of each lateral stop 121a, 121b forming the lateral keying member 120 is situated vertically above the locking face 1153 of the vertical locking member 115 of the angular indexing system 110. In other words, the locking surface 1213 is situated vertically in an intermediate position between the locking face 1153 and the bearing face 205 of the cover 200.

Alternatively, the locking face 1153 is situated vertically in an intermediate position between the locking surface 1213 and the bearing face 205 of the cover 200. Alternatively again, the locking face 1153 is situated vertically in the same plane as the locking surface 1213.

In particular, the lip of each lateral stop extends towards the opposite lateral side of the cover in order to allow engagement with the main cross-bar with which the adapter according to the first aspect of the invention is intended to interact on the rotating movement of the cover relative to said main cross-bar;

The lip 1212 of each lateral stop 121a, 121b forming the lateral keying member 120 is laterally delimited at a free end by a lateral bearing face 1214. The lateral bearing face 1214 of each lateral stop 121a, 121b is advantageously parallel to the corresponding lateral side 210 of the cover 200.

For each lateral stop 121a, 121b, the lip 1212 extends laterally towards the opposite lateral side 210 of the cover 200, relative to the lateral side 210 from which the lateral stop 121a, 121b is formed; the lateral bearing face 1214 of each lateral stop 121a, 121b is oriented laterally on the side of the central opening 230 of the cover 200.

An exemplary embodiment of a main cross-bar 410 of a wiper blade 500 mounting 400 will now be described with reference to FIGS. 2A, 2B and 2C, the main crossbar 410 being configured to interact with the adapter 300 as described above.

The main cross-bar 410 of the windscreen wiper mounting 400 takes an elongated form along the longitudinal axis X and a narrower form along the transverse axis Y and the vertical axis Z. Relative to the longitudinal axis X, the main cross-bar 410 comprises a central zone 409 longitudinally delimited by a front nose 408 and a rear nose 407. The central zone 409 of the main cross-bar 410 is configured to interact with the adapter 300, and more particularly with the cover 200 as described above; the central zone 409 takes the form of a bearing platform 415 for the cover 200. The bearing platform 415 is longitudinally delimited by a rear longitudinal end 419b and a front longitudinal end 419a.

Figure 2A:
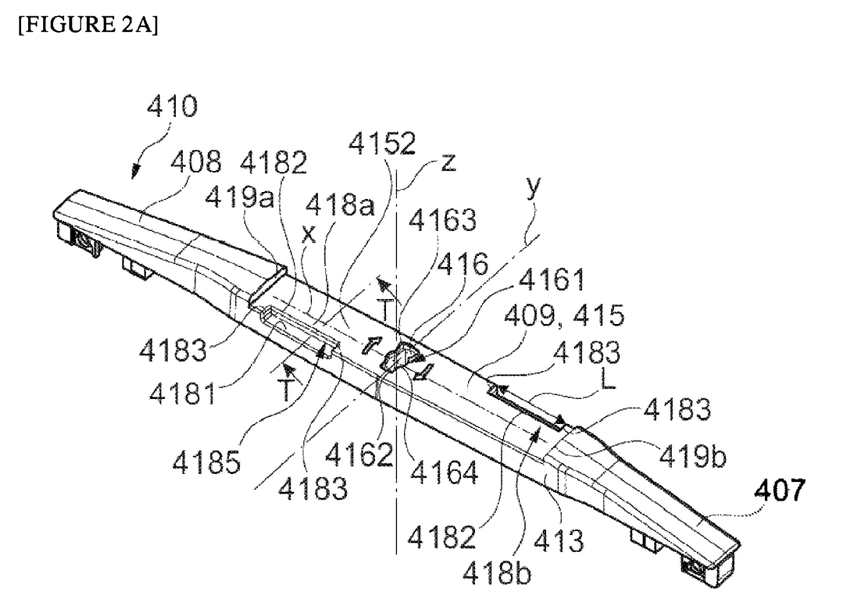
FIG. 2A illustrates a perspective view of an exemplary embodiment of a main cross-bar of a wiper blade according to the second aspect of the invention.

In the example illustrated in FIG. 2A, the front and rear longitudinal ends 419a and 419b take the form of a linear segment. Alternatively, in order to facilitate the insertion of the adapter 300 on the bearing platform 415 of the main cross-bar 410 by a rotating movement about the vertical axis Z, the front and rear longitudinal ends 419a and 419b can take the form of a circular segment a center of which is situated in line with the shaft 111 of the angular indexing system 110 of the assembly device 100 of the adapter 300.

The front nose 408 and the rear nose 407 are configured to interact with secondary cross-bars 420 and comprise means for detachably fastening said secondary cross-bars 420 to the main cross-bar 410.

A transverse dimension of the central zone 409 of the main cross-bar 410 is equal to a transverse dimension of the cover 200 of the adapter 300. More particularly, the lateral edges 413 of the central zone 409 are advantageously situated continuing on from the lateral sides 210 of the cover 200. Preferably, and as can be seen in FIG. 3C, the lateral edges 413 of the central zone 409 are coplanar with the lateral sides 210 of the cover 200 and with the lateral sides 120.

A longitudinal dimension of the central zone 409 is such that it makes it possible to insert the cover 200 between the front nose 408 and the rear nose 407 of the main cross-bar 410 according to the assembly method described below with reference to FIGS. 3A, 3B and 3C. More particularly, when the adapter 300 is assembled on the main cross-bar 410, the bearing face 205 and the lower edge 121 of the cover 200 are pressing vertically against the bearing platform 415.

According to the invention, the cover 200 and the main cross-bar 410 are configured to allow the mechanical coupling of the adapter 300 on the mounting 400 by a relative rotating movement of said cover 200 in relation to said main cross-bar 410.

To this end, the bearing platform 415 of the main cross-bar 410 comprises an opening 416 configured to allow the insertion without play of the shaft 111 and the vertical locking member 115 of the angular indexing system 110 of the cover 200, and in a first angular configuration of said cover 200 relative to the main cross-bar 410 as will be described with reference to FIGS. 3A, 3B and 3C. As can be seen in FIGS. 2A and 2B, the opening 416 is delimited by a peripheral outline 4161 that has the shape of the shaft 111 and the vertical locking member 115 of the angular indexing system 110 of the cover 200. More specifically, the peripheral outline 4161 corresponds to a homothetic transformation of the shape of the shaft 111 and of the vertical locking member 115 of the angular indexing system 110. The homothetic transformation is advantageously of the enlargement type in order to allow the insertion of the angular indexing system 110 into the opening 416 without friction. By way of non-limiting example, the play between the angular indexing system 110 and the opening 416 is of the order of one tenth of a millimeter.

Figure 2B:
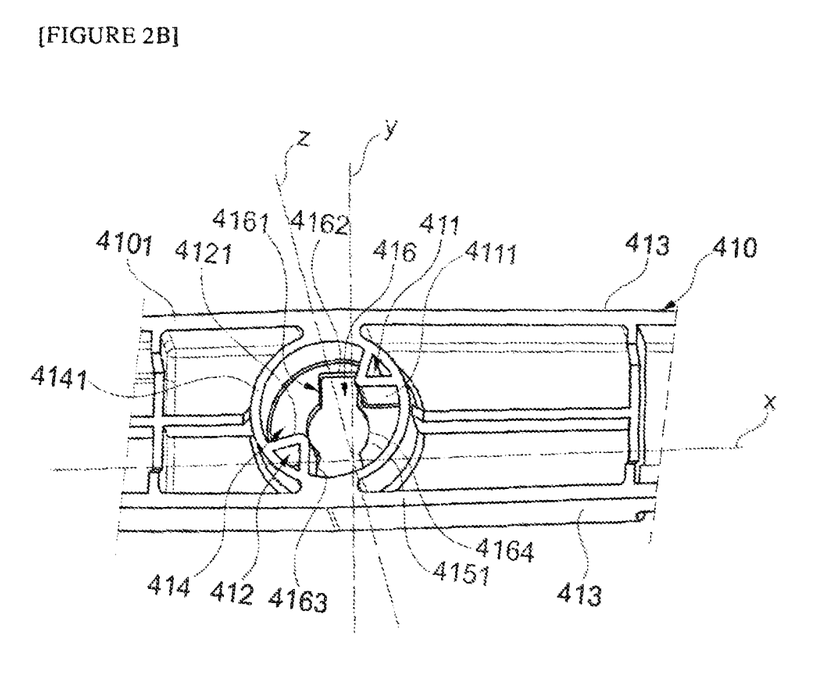
FIG. 2B illustrates a detailed perspective view of an indexing recess of the main cross-bar illustrated in FIG. 2A.

In the example illustrated in FIGS. 2A and 2B, the outline 4161 of the opening 416 therefore comprises a circular part 4164 situated in the center and laterally framed by two elongated parts 4162, 4163:
- a first elongated part 4162 has a rectangular shape similar to the first boss 1151 of the vertical locking member 115, said first elongated part 4162 ending—at a distal end relative to the circular part 4164—in a circular outline, similar to the circular face 1154 of the first boss 1151 of the vertical locking member 115;
- a second elongated part 4163 has a trapezoid shape similar to the second boss 1152 of the vertical locking member 115, said second elongated part 4163 ending— at a distal end relative to the circular part 4164—in a circular outline, similar to the circular face 1154 of the second boss 1152 of the vertical locking member 115.

As can be seen in FIGS. 2A and 2B, the opening 416 of the main cross-bar 410 is oriented transversely between two lateral edges 413 of the bearing platform 415 of the main cross-bar 410. More particularly, the first elongated part 4162 of the outline 4161 defining the opening 416 is situated laterally on the opposite side from the second elongated part 4163 of said outline 4161 relative to the circular part 4164 of the outline 4161. This transverse orientation of the opening 416 makes it possible, in conjunction with a longitudinal elongation of the vertical locking member 115 of the cover 200 of the adapter 300, to define an angular engaged configuration of the cover 200 on the cross-bar 410, that is, an angular engaged configuration of the vertical locking member 115 in the opening 416. This angular engaged configuration corresponds to an angle of 90° along the vertical axis Z between the cover 200 and the main cross-bar 410.

The opening 416 is situated longitudinally near the center of the main cross-bar 416, and more particularly near the center of the bearing platform 416 of the main cross-bar 410.

As can be seen in FIG. 2B, the opening 416 passes through the bearing platform 415 of the main cross-bar 410 along the vertical axis Z, towards a lower face 4101 of said main cross-bar 410. In other words, the opening 416 is a through-opening, along the vertical axis Z.

With reference to FIG. 2B, the main cross-bar 410 comprises an indexing recess 414 into which the vertical locking member 115 of the assembly device 100 of the cover 200 can be inserted during the operation to assemble the adapter 300 according to the first aspect of the invention on the mounting 400 of the wiper blade 500. The indexing recess 414 thus forms a hollow recess radially delimited by a cylindrical wall 4141 and vertically delimited by an inner face 4151 of the bearing platform 415. The cylindrical wall 4141 forms a circular outline coaxial with the circular part 4164 of the outline 4161 of the opening 416.

In particular, a vertical thickness of the bearing platform 415 of the main cross-bar 410—taken between (i) its upper face 4152 against which the bearing face 205 of the cover 200 is pressed and (ii) the lower face 4151 of the bearing platform 415—is substantially equal to the distance separating the locking face 1153 of the vertical locking member 115 of the angular indexing system 110 and the bearing face 205 of the cover 200. This advantageous configuration makes it possible to vertically lock the cover 200 against the main cross-bar 410 by friction between the locking face 1153 of the vertical locking member 115 of the angular indexing system 110 on the lower face 4151 of the bearing platform 415 taken between the cylindrical walls 4141 of the indexing recess 414 of the main cross-bar 410.

As can be seen in FIG. 2B, the indexing recess 414 of the main cross-bar 410 comprises a first indexing stop 411 and a second indexing stop 412, the indexing stops 411, 412 being configured to interact with the vertical locking member 115 of the angular indexing system 110 of the cover 200 of the adapter 300. More particularly:
  the first indexing stop 411 is configured to interact respectively with one of the lateral edges 1155 of the second boss 1152 of the vertical locking member 115 of the cover 200. This interaction takes the form of the lateral edge 1155 pressing flat against a lateral flank 4111 of the first indexing stop 411, when the angular indexing system 110 of the cover 200 is configured in its second angular configuration relative to the main cross-bar 410; and
  the second indexing stop 412 is configured to interact respectively with one of the lateral sides 1156 of the first boss 1151 of the vertical locking member 115 of the cover 200. This interaction takes the form of the lateral side 1156 pressing flat against a lateral flank 4121 of the second indexing stop 412, when the angular indexing system 110 of the cover 200 is configured in its second angular configuration relative to the main cross-bar 410.

The lateral flank 4111 of the first indexing stop 411 and the lateral flank 4121 of the second indexing stop 412 together define the second angular configuration of the angular indexing system 110 relative to the main cross-bar 410.

The first indexing stop 411 is situated on the side of the first elongated part 4162 of the outline 4161 defining the opening 416, and the lateral flank 4111 of the first indexing stop 411 is situated near the circular part 4164 of said outline 4161. The lateral flank 4111 of the first indexing stop 411 is parallel to the lateral edges 431 of the main cross-bar 410.

The second indexing stop 412 is situated on the side of the second elongated part 4163 of the outline 4161 defining the opening 416, and the lateral flank 4121 of the second indexing stop 412 is situated near the circular part 4164 of said outline 4161. The lateral flank 4121 of the second indexing stop 412 forms a non-zero angle with one of the lateral edges 431 of the main cross-bar 410.

Longitudinally, the first indexing stop 411 and the second indexing stop 412 are situated on either side of the circular part 4164 of the outline 4161 defining the opening 416.

Figure 2C:
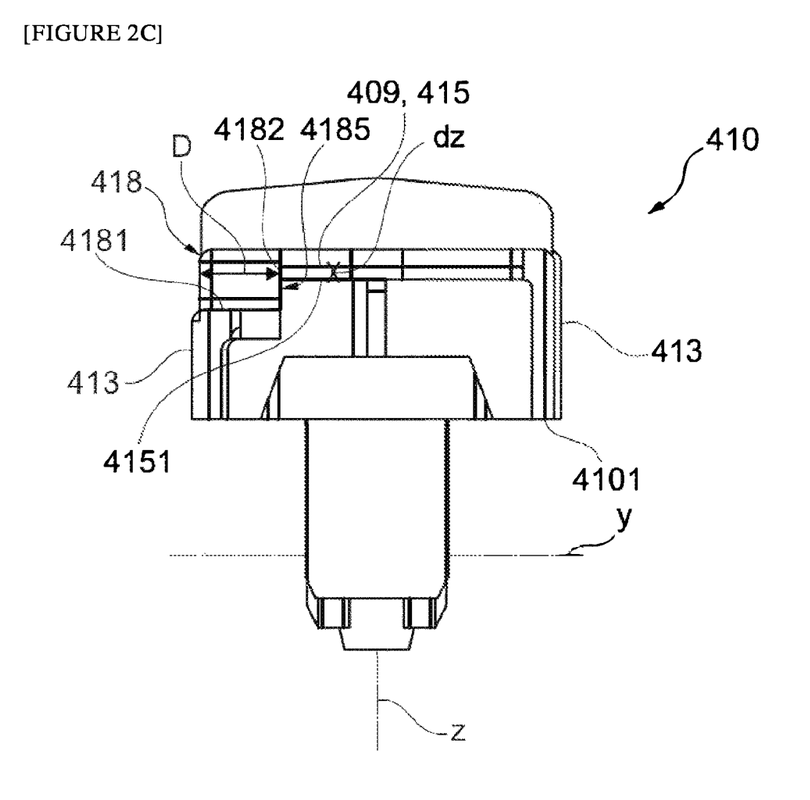
FIG. 2C illustrates a transverse cross-sectional view along the line TT of the main cross-bar illustrated in FIG. 2A.

As can be seen in FIGS. 2A and 2C, the bearing platform 415 of the main cross-bar 410 comprises two lateral keying recesses 418a, 418b configured to allow engagement with the lateral keying member 120 of the angular indexing system 110 of the cover 200 of the adapter 300. In particular, the bearing platform 415 comprises:
  a first lateral keying recess 418b interacting with the first lateral stop 121a of the keying member 120, the first lateral keying recess 418b being situated in a first lateral edge 413 of the bearing platform 415; and
  a second lateral keying recess 418a interacting with the second lateral stop 121b of the keying member 120, the second lateral keying recess 418a being situated in a second lateral edge 413 opposite the first lateral edge of the bearing platform 415.

When the adapter 300 is assembled on the main cross-bar 410 of the wiper blade 500 mounting 400, during the rotating movement, each lateral stop 121a, 121b of the cover 200 thus engages in the lateral keying recess 418a, 418b situated facing it on the main cross-bar 410.

The first lateral keying recess 418b is situated at the rear longitudinal end 419b of the bearing platform 415, and the second lateral keying recess 418a is situated at the front longitudinal end 419a of the bearing platform 415.

Each lateral keying recess 418a, 481b interacting with the keying member 120 of the angular indexing system 110 of the cover 200 is delimited by:
  a lower surface 4181 parallel to the bearing platform 415. The lower surface 4181 of each lateral keying recess 418a, 418b is situated vertically below the bearing platform 415. More particularly, the lower surface 4181 of each lateral keying recess 418a, 418b is situated vertically at a distance that is greater than the distance vertically separating (i) the lower face 1215 of the lateral stops 121a, 121b forming the lateral keying member 120 of the cover 200 from (ii) the bearing face 205 of said cover 200. This configuration thus makes it possible to obtain a non-zero vertical play E, which can be seen in FIG. 3C, when the adapter is coupled to the main cross-bar 410 in order to avoid static indeterminacy and reduce the manufacturing costs of the cover 200 and/or the main cross-bar 410; and
  a lateral bearing surface 4182 situated set back relative to the corresponding lateral edge 413 of the bearing platform 415. The lateral bearing surface 4182 of each lateral keying recess 418a, 418b is suitable for being pressed against the lateral bearing face 1214 of the lip 1212 of each lateral stop 121a, 121b forming the lateral keying member 120 of the angular indexing system 110 of the cover 200 of the adapter 300. The lateral bearing surface 4182 of the main cross-bar 410 is advantageously parallel to the lateral edges 413 of said main cross-bar 410. In addition, a lateral distance D, taken along the transverse axis Y, between (i) the lateral edge 413 of the main cross-bar 410 in which the corresponding lateral keying recess 418a, 418b is formed and (ii) the lateral bearing surface 4182 of said corresponding lateral keying recess 418a, 418b is advantageously identical for both lateral keying recesses 418a, 418b; and
  two longitudinal edges 4183 distant from each other along the longitudinal axis X in order to allow the insertion of the lateral keying member 120 of the angular indexing system 110 of the cover 200 of the adapter 300 into the corresponding lateral keying recess 418a, 418b of the main cross-bar 410, by a rotating movement about the shaft 111 of said angular indexing system 110. More particularly, a longitudinal length L between the two longitudinal edges 4183 of each lateral keying recess 418a, 418b is slightly greater than a longitudinal length of the lateral stops 121a, 121b forming the lateral keying member 120 of the angular indexing system 110 of the cover 200 of the adapter 300 in order to allow insertion without play. In the example illustrated in FIGS. 2A, 2B and 2C, the longitudinal edges 4183 are straight. Alternatively, the longitudinal edges 4183 are arc-shaped, centered on the opening 416 of the main cross-bar 410.

As can be seen in FIGS. 2A and 2C, each lateral keying recess 418a, 418b comprises an oblong slot 4185 that extends longitudinally in the lateral bearing surface 4182, so as to allow the insertion of the lip 1212 of the corresponding lateral stop 121a, 121b forming the lateral keying member 120 of the cover 200 into said oblong slot 4185, on the mechanical coupling of the cover 200 of the adapter 300 to the main cross-bar 410. Continuing on laterally from the oblong slot 4185 of each lateral keying recess 418a, 418b of the main cross-bar 410, a vertical thickness dZ of the bearing platform 415 of the main cross-bar 410 is substantially equal to the distance separating (i) the locking surface 1213 of the lip 1212 of the lateral stops 121a, 121b forming the lateral keying member 120 of the angular indexing system 110 from (ii) the bearing face 205 of the cover 200 in order to allow the angular locking of the cover 200 on the main cross-bar 410 at the end of the rotating movement about the vertical axis Z of the adapter 300 relative to the main cross-bar 410, by friction between the locking surface 1213 and a lower face 4151 of the bearing platform 415 in line with the oblong slot 4185 of the main cross-bar 410.

Figure 4:
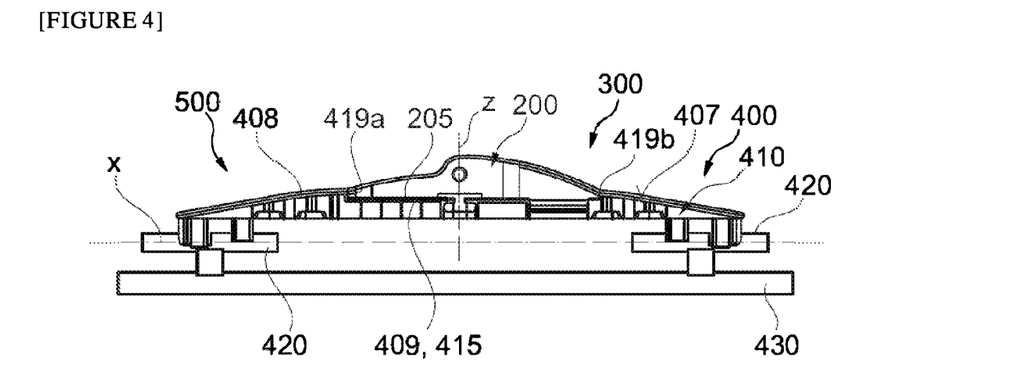
FIG. 4 illustrates a longitudinal cross-sectional view along the line LL of the wiper blade illustrated in FIG. 3C.

A method 600 for assembling the adapter 300 on the wiper blade 500 mounting 400 according to the fourth aspect of the invention will now be described with reference to FIGS. 3 to 5. Additionally, FIGS. 3A to 3C illustrate the performance of the steps—represented by arrows—of the method 600 for assembling the wiper blade 500, and FIG. 5 illustrates a block diagram of said assembly method 600.

Such a wiper blade 500 according to the second aspect of the invention comprises an adapter 300 according to the first aspect of the invention and a mounting 400 comprising:

- a main cross-bar 410 of the type described above with reference to FIGS. 2A, 2B and 2C, to which the adapter 300 is removably fastened;
- two secondary cross-bars 420 rigidly connected to the main cross-bar 410 and supporting a wiper rubber 430 suitable for wiping a glazed panel of a motor vehicle in order to remove the water present on its surface.

Figure 5:
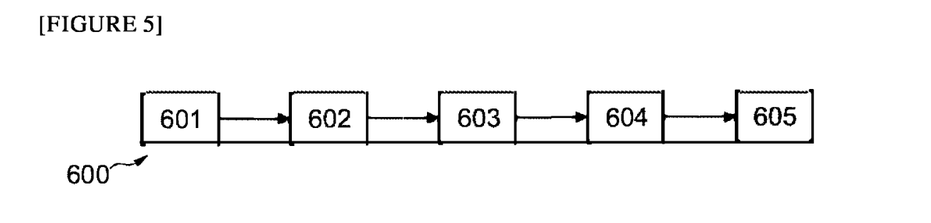
FIG. 5 illustrates, in the form of a block diagram, the method for assembling the adapter on a wiper blade mounting, according to the fourth aspect of the invention and as illustrated in FIGS. 3A, 3B and 3C.

With reference to FIG. 5 in particular, and as shown by assembly arrows in FIGS. 3A to 3C, the method 600 for assembling the adapter 300 according to the first aspect of the invention on a wiper blade 500 mounting 400 comprises the following steps:

- a step 601 of inserting the angular indexing system 110 of the cover 200 of the adapter 300 into the opening 416 of the main cross-bar 410 of the wiper blade 500 mounting 400, while the angular indexing system 110 and/or the cover 200 is configured, in the opening 416 of the main cross-bar 410, in its first angular configuration. As can be seen in FIG. 3A, the cover 200 is pivoted through 90° relative to the main cross-bar 410 in order to align the orientations of the shaft 111 and the vertical locking member 115 of the cover 200 with the opening 416 of the main cross-bar 410. Consecutively, as described above, the shaft 111 and the vertical keying member 115 of the cover are inserted vertically—and with transverse and/or longitudinal play—into the opening 416 of the main cross-bar 410;
- a step 602 of pressing the cover 200 of the adapter 300 against the main cross-bar 410 of the wiper blade 500 mounting 400. More particularly, the bearing face 205 of the cover 200 is pressed against the bearing platform 415 of the main cross-bar 410 by a straight translational movement of the cover 200 relative to the main cross-bar 410 along the vertical axis Z. During this pressing step 602, the shaft 111 and the vertical locking member 115 of the angular indexing system 110 of the cover 200 are inserted into the indexing recess 414 of the main cross-bar 410;
- following the pressing step 602, a step 603 of rotating the cover 200 relative to the main cross-bar 410 in order to configure the angular indexing system 110 of said cover 200 in the indexing recess 414 of said main cross-bar 410 in its second angular configuration, as described above. In this rotation step 603, the cover 200 is kept pressed vertically against the main cross-bar 410. More particularly, the cover 200 is pivoted about the shaft 111 of the angular indexing system 110 in order to cause the shaft 111 and the vertical locking member 115 to pivot relative to the opening 416 of the main cross-bar 410, so as to engage the bosses 1151, 1152 of the vertical locking member 115 below the bearing platform 415 to prevent it being possible to detach the cover 200 from the main cross-bar 410 by a simple vertical translational movement. In this second angular configuration of the angular indexing system 110 relative to the indexing recess 414 of the main cross-bar 410, the cover 200 is pivoted through a 90° angle relative to the vertical axis Z, so that the bosses 1151, 1152 of the vertical locking member 115 are pivoted through a 90° angle relative to the opening 416;
- during the step 603 of rotating the cover 200 relative to the main cross-bar 410, a step 604 of engaging the lips 1212 of the lateral stops 121a, 121b forming the lateral keying member 120 of the cover 200 in the corresponding oblong slots 4185 of the lateral keying recesses 418a, 418b of the main cross-bar 410;
- at the end of the rotation step 603, and after the engagement step 604, a step 605 of laterally abutting the cover 200 against the main cross-bar 410. In particular, the lateral abutment step 605 comprises a step of laterally abutting the angular indexing system 110 of the cover 200 in the corresponding indexing recess 418a, 418b of the main cross-bar 410. More specifically, the lateral edges 1156 and sides 1155 of the bosses 1151, 1152 of the vertical locking member 115 of the angular indexing system 110 are pressed against the lateral flanks 4111 of the indexing stops 411 housed in the indexing recess 414 of the main cross-bar 410.

In summary, the invention relates in particular to an adapter 300 of a wiper blade 500 mounting 400, the adapter 300 comprising a cover 200 that can be removably fastened to a main cross-bar 410 of the mounting 400, by a single rotating movement allowing the engagement of complementary shapes between the cover 200 and the main cross-bar 410. According to the invention, the cover 200 comprises an angular indexing system 110 that makes it possible to define an axis of rotation of the cover 200, the angular indexing system 110 interacting with an opening 416 of the main cross-bar 410. The opening 416 and the angular indexing system 110 have an asymmetrical shape to allow the angular indexing of the cover 200 relative to the main cross-bar 410 and, consecutively, the mechanical coupling of said cover 200 to said main cross-bar 410.

Of course, the invention is not limited to the examples that have just been described, and numerous modifications can be made to these examples without departing from the scope of the invention. In particular, the various features, forms, variants and embodiments of the invention can be associated with each other, in various combinations, provided that they are not incompatible or mutually exclusive. In particular, all of the variants and embodiments described above can be combined with each other.

What is claimed is:

1. An adapter for fastening a wiper blade mounting on an articulated wiper blade arm, the adapter comprising:
   a cover configured so that it can be removably fastened to a main cross-bar of the wiper blade mounting;
   a device for assembling the cover on the main cross-bar of the wiper blade mounting; and an assembly device comprising an angular indexing system configured to allow the assembly of the cover on the main cross-bar by rotating said cover relative to said main cross-bar, the angular indexing system comprising:
   a shaft that extends protruding relative to a bearing face of the cover, and
   a vertical locking member situated at a free end of the shaft of the angular indexing system, the vertical locking member being configured to adopt:
   a first angular configuration in which the vertical locking member allows the insertion of the cover into the main cross-bar; and
   a second angular configuration in which the vertical locking member allows the rigid connection of the cover to the main cross-bar.

2. The adapter as claimed in claim 1, in which the vertical locking member of the angular indexing system comprises:
   a first boss that extends perpendicularly relative to the shaft of said angular indexing system;
   a second boss that extends perpendicularly relative to the shaft of said angular indexing system.

3. The adapter as claimed in claim 2, in which the vertical locking member of the angular indexing system comprises a locking face situated facing the bearing face of the cover, and/or the first and second bosses of the vertical locking member of the angular indexing system are longitudinally delimited by a circular face.

4. The adapter as claimed in claim 2, in which the first boss is prismatic and laterally delimited by two flat, parallel lateral sides, and/or the second boss is laterally delimited by two flat lateral edges forming an angle of between 20° and 45°.

5. The adapter as claimed in claim 1, in which the angular indexing system comprises a lateral keying member configured to allow the lateral alignment of the cover on the main cross-bar, said lateral keying member of the angular indexing system comprising:
   a first lateral stop situated on a first lateral side of the cover; and
   a second lateral stop situated on a second lateral side opposite the first lateral side of the cover.

6. The adapter as claimed in claim 5, in which each lateral stop forming the lateral keying member of the angular indexing system takes the form of a tab having an L-shaped transverse profile, said lateral stop comprising:
   a longitudinally extending boss that extends protruding from the bearing face of the cover; and
   a lip situated at a distal end of the longitudinally extending boss, said lip extending laterally relative to said longitudinally extending boss.

7. The adapter as claimed in claim 6, in which the lip of each lateral stop extends towards the opposite lateral side of the cover and/or comprises a locking surface situated facing the bearing face of the cover.

8. A wiper blade for a motor vehicle comprising:
   an adapter as claimed in claim 1;
   a wiper blade mounting, the mounting comprising:
   a main cross-bar to which the adapter is removably fastened;
   two secondary cross-bars fastened to the main cross-bar and supporting a wiper rubber.

9. The wiper blade as claimed in claim 8, in which the main cross-bar comprises a bearing platform against which the bearing face of the cover is pressed, said bearing platform of the main cross-bar comprising an opening configured to allow the engagement of the shaft and the vertical locking member of the angular indexing system.

10. The wiper blade as claimed in claim 9, in which the main cross-bar comprises a recess for indexing the cover of the adapter relative to said main cross-bar, the indexing recess being radially delimited by a cylindrical wall and vertically delimited by the bearing platform.

11. The wiper blade as claimed in claim 9, in which the angular indexing system comprises a lateral keying member configured to allow the lateral alignment of the cover on the main cross-bar, said lateral keying member of the angular indexing system comprising a first lateral stop situated on a first lateral side of the cover, and a second lateral stop situated on a second lateral side opposite the first lateral side of the cover, and in which the bearing platform comprises:
   a first lateral keying recess interacting with the first lateral stop of the lateral keying member, the first lateral keying recess being situated in a first lateral edge of the bearing platform; and
   a second lateral keying recess interacting with the second lateral stop of the lateral keying member, the second lateral keying recess being situated in a second lateral edge opposite the first lateral edge of the bearing platform.

12. The wiper blade as claimed in claim 11, in which each lateral keying recess interacting with the keying member of the angular indexing system of the cover of the adapter is delimited by:
   a lower surface situated vertically at a distance from the bearing platform that is greater than the distance vertically separating the lower face of the lateral keying member of the cover from the bearing face of said cover; and/or
   a lateral bearing surface situated set back relative to the lateral edge of the bearing platform, said lateral bearing surface of each lateral keying recess being suitable for being pressed against the lateral bearing face of the lip of each lateral stop forming the lateral keying member of the angular indexing system of the cover of the adapter; and/or
   two longitudinal edges allowing the insertion of the lateral keying member of the angular indexing system of the cover of the adapter into the corresponding lateral keying recess, by a rotating movement about the shaft of said angular indexing system.

\* \* \* \* \*